(12) United States Patent
Masecar (10) Patent No.: US 9,296,252 B2
(45) Date of Patent: Mar. 29, 2016

(54) POSITIONING AND APPLICATION DEVICE FOR THE PLACEMENT OF ADHESIVE TAPES AND THE LIKE

(71) Applicant: Robert Rolph Masecar, Holly Springs, NC (US)

(72) Inventor: Robert Rolph Masecar, Holly Springs, NC (US)

( * ) Notice: Subject to any disclaimer, the term of this patent is extended or adjusted under 35 U.S.C. 154(b) by 0 days.

(21) Appl. No.: 14/548,778

(22) Filed: Nov. 20, 2014

(65) Prior Publication Data

US 2015/0136329 A1     May 21, 2015

Related U.S. Application Data

(60) Provisional application No. 61/907,049, filed on Nov. 21, 2013.

(51) Int. Cl.
    *B44C 7/00*     (2006.01)
    *B29C 65/00*     (2006.01)
    *B44C 1/10*     (2006.01)
    *B65H 35/00*     (2006.01)
    *B29C 63/02*     (2006.01)
    (Continued)

(52) U.S. Cl.
    CPC .............. *B44C 1/105* (2013.01); *B29C 63/024* (2013.01); *B65H 35/002* (2013.01); *B65H 37/005* (2013.01); *B29C 2063/0008* (2013.01); *B65H 2801/51* (2013.01); *Y10T 156/1744* (2015.01); *Y10T 156/1795* (2015.01)

(58) Field of Classification Search
CPC .... B29C 65/50; B29C 65/5092; B29C 63/02; B29C 63/024; B44C 1/10; B65H 35/004; B65H 35/006; B65H 75/025; B65H 16/005; B65H 35/0033; B65H 37/04; B65H 2801/51; B65H 75/08; B65H 75/4415; B65H 75/24; B65H 75/241; Y10T 156/1795; Y10T 156/17; Y10T 156/1788; Y10T 156/1712; Y10T 156/1744; E04D 15/06; E04D 21/0038; B25F 3/02; B29L 2031/26; B29L 2031/3055; E04F 21/0038; B60R 13/00
See application file for complete search history.

(56) References Cited

U.S. PATENT DOCUMENTS 1,226,928 A   *   5/1917   Updike ........................... 225/44
2,408,461 A   *   10/1946   Wickerham ............. H02P 25/28
                                                                                           318/461

(Continued)

FOREIGN PATENT DOCUMENTS

DE          4239116 A1   *   6/1993          B65H 7/04
GB          588674 A   *   5/1947          B65H 35/0033

*Primary Examiner* — Alex Efta
(74) *Attorney, Agent, or Firm* — PatentFile, LLC; Bradley C. Fach; Steven R. Kick (57) ABSTRACT

An adhesive tape application placement device for applying an elongated adhesive material to an adherend is disclosed. In preferred embodiments, the device comprises: an elongated connection rod having a first end and a second end configured to pass through a plurality of connection rod receiving apertures; a spool having a connection rod receiving aperture positioned on the elongated connection rod; a first spool retainer having a connection rod receiving aperture positioned on the elongated connection rod proximate to the spool; and an adjustable offset bumper having a connection rod receiving aperture and an offset bumper guide arm positioned on the elongated connection rod proximate to the first spool retainer. Adhesive tape may be pressed onto an adherend by the spool while the movement of the spool over the adherend may be guided by an offset bumper guide arm contacting and moving over the object with a surface comprising an adherend.

19 Claims, 9 Drawing Sheets

(51) Int. Cl.
 *B65H 37/00* (2006.01)
 *B29C 63/00* (2006.01)

(56) References Cited

U.S. PATENT DOCUMENTS

| | | | | |
|---|---|---|---|---|
| 2,480,461 A * | 8/1949 | Gabrielson | ......... | B65H 16/005 |
| | | | | 242/578.2 |
| 4,166,589 A * | 9/1979 | Hoover et al. | ............. | 242/423.1 |
| 4,221,628 A * | 9/1980 | Rosenberg | ............. | E04D 15/06 |
| | | | | 156/577 |
| 4,263,347 A * | 4/1981 | Banta | ................. | B05B 15/0456 |
| | | | | 118/505 |
| 4,286,729 A * | 9/1981 | Downing | ........................ | 221/70 |
| 6,284,076 B1 * | 9/2001 | Mattson | ................. | B32B 37/10 |
| | | | | 156/577 |
| 6,585,023 B2 | 7/2003 | Azuhata | | |
| 6,698,489 B1 | 3/2004 | Shinozaki et al. | | |
| 6,748,993 B1 | 6/2004 | Shinozaki et al. | | |
| 6,789,974 B2 | 9/2004 | Atkinson et al. | | |
| 7,287,567 B2 | 10/2007 | Fujiwara | | |
| 7,506,678 B2 | 3/2009 | Degawa et al. | | |
| 7,543,426 B1 * | 6/2009 | Phero | .................... | B65B 67/085 |
| | | | | 156/574 |
| 2003/0208994 A1 * | 11/2003 | Gooding et al. | ................. | 53/557 |
| 2011/0233321 A1 * | 9/2011 | Yu Chen | .................... | 242/588.2 |

\* cited by examiner

POSITIONING AND APPLICATION DEVICE FOR THE PLACEMENT OF ADHESIVE TAPES AND THE LIKE

CROSS REFERENCE TO RELATED APPLICATIONS

This application claims priority to and the benefit of the filing date of U.S. Provisional Application No. 61/907,049, filed on Nov. 21, 2013, entitled "NOVEL POSITIONING AND APPLICATION DEVICE FOR THE PLACEMENT OF ADHESIVE TAPES AND THE LIKE", which is hereby incorporated by reference in its entirety.

FIELD OF THE INVENTION

The present patent specification relates to novel adhesive tape placement devices and apparatuses for positioning and applying adhesive tape to an adherend. More particularly, this patent specification relates to a placement device that is capable of positioning and applying adhesive tapes of various sizes along curved and straight surfaces found on vehicles and the like.

BACKGROUND

Vehicle customization has been a fast growing area of interest for many automobile and motorbike enthusiasts. This customization may include the application of stripes of various sizes and colors along desired areas of the vehicle. These stripes are often referred to as pinstripes and have traditionally required a steady hand to apply and paint the pinstripes in a uniform manner.

Recently, the development of adhesive tapes in various colors and sizes has been adapted to take the place of painted pinstripes. Adhesive tape pinstriping offers several advantages over painted pinstripes including ease of application and removal. However, adhesive tape application also requires a skilled hand in order to ensure that the pinstripe is applied in a uniform manner and spacing along the vehicle surfaces.

Certain dispensers have been developed for the application of adhesive tape along various surfaces. The devices are configured to remove the nonadhesive backing as the adhesive tape is deployed and pressed onto a surface.

However, these dispensers suffer many drawbacks that hinder the application of the tape. These dispensers are typically only able to apply tape in one direction which results in awkward positioning or necessitating removal of wheels and panels in order to apply the tape correctly. Also, adhesive tapes are offered in a variety of widths, while these dispensers are only configured to accept tapes in one width size. This results in the need for multiple dispensers to accommodate tapes with various width sizes.

Another drawback is that the dispensers have only one area that can be used as a guide for the placement and positioning of the tape. This guide is configured to contact a portion of the surface to which the tape will be applied, and therefore, functions to guide the motion of the user's hand during application. Since vehicle surfaces vary in shape and size, the sole guide is unable to accommodate every surface resulting in the need to free hand the tape application over a variety of vehicle surfaces. All of the aforementioned disadvantages work together to increase the difficulty in applying uniform and correctly placed adhesive tape pinstriping.

Therefore, a need exists in the field for novel adhesive tape placement devices and apparatuses capable of positioning the application of adhesive tapes in any direction along an adherend which is important for ease of installation depending on whether the installer is left or right handed, and whether obstructions, such as a motorcycle rear wheel swingarm, dictate where the device must be held during installation. A further need exists for an adhesive tape placement device that is able to accommodate tapes of different widths. Finally, there is also a need for the adhesive tape placement device to be configured with a guide that is able to conform to the movement of the device to the various surface shapes frequently encountered on vehicles and the like.

BRIEF SUMMARY OF THE INVENTION

An adhesive tape application placement device for applying an elongated adhesive material to an adherend is disclosed. In preferred embodiments, the device comprises: an elongated connection rod having a first end and a second end configured to pass through a plurality of connection rod receiving apertures; a spool having a connection rod receiving aperture positioned on the elongated connection rod; a first spool retainer having a connection rod receiving aperture positioned on the elongated connection rod proximate to the spool; and an adjustable offset bumper having a connection rod receiving aperture and an offset bumper guide arm positioned on and slidably engaged about the elongated connection rod proximate to the first spool retainer. Adhesive tape may be pressed onto an adherend by the spool while the movement of the spool over the adherend may be guided by an offset bumper guide arm contacting and moving over the object with a surface comprising an adherend.

In further preferred embodiments, the adjustable offset bumper may be configured to be secured to the elongated connection rod at a plurality of fixed positions whereby the distance between the adjustable offset bumper and the spool may not be fixed.

In further preferred embodiments, the offset bumper may comprise two or more offset bumper guide arms. The offset bumper guide arms each comprise a distal tip with one or more of the offset bumper guide arms having a length, as measured from the distal tip to the center of the connection rod receiving aperture, than the length of one or more other offset bumper guide arms. By rotating the adjustable offset bumper around the elongated connection rod, one or more offset bumper guide arms of a desired length may be positioned or moved from a first orientation to a second orientation, allowing the distal tip of the desired offset bumper guide arm to contact the object with a surface comprising an adherend and guide the movement of the device as the application tape is applied to the adherend.

In still further embodiments, the device may comprise an adjustable locking element such as a lock nut which may be positioned proximate the first spool retainer and an optional indexing bumper which may be positioned proximate to the connection rod cap.

In further preferred embodiments, the elongated connection rod may comprise threading and the connection rod receiving apertures of a thumbscrew locknut, adjustable offset bumper, and an adjustable locking element comprise threading that is complementary to the threading on the elongated connection rod, thereby allowing the thumbscrew locknut, adjustable offset bumper, and adjustable locking element to be rotatably positioned at a plurality of fixed positions on the elongated connection rod. Furthermore, the spool, first spool retainer, second spool retainer, and an optional indexing bumper may be configured with connection rod receiving apertures that do not comprise threading and are larger in diameter than the diameter of the threaded elongated connection rod, thereby allowing the spool, first spool retainer, second spool retainer, and optional indexing bumper to slide and rotate freely along the length of the elongated connection rod so that their positions may not be fixed relative to the thumbscrew locknut, adjustable offset bumper, and/or adjustable locking element.

BRIEF DESCRIPTION OF THE DRAWINGS

Some embodiments of the present invention are illustrated as an example and are not limited by the figures of the accompanying drawings, in which like references may indicate similar elements and in which.

DETAILED DESCRIPTION OF THE INVENTION

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

New adhesive tape placement devices, devicees, and methods for positioning adhesive tapes along straight and contoured adherends are discussed herein. In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention, and is not intended to limit the invention to the specific embodiments illustrated by the figures or description below.

Figure 1:
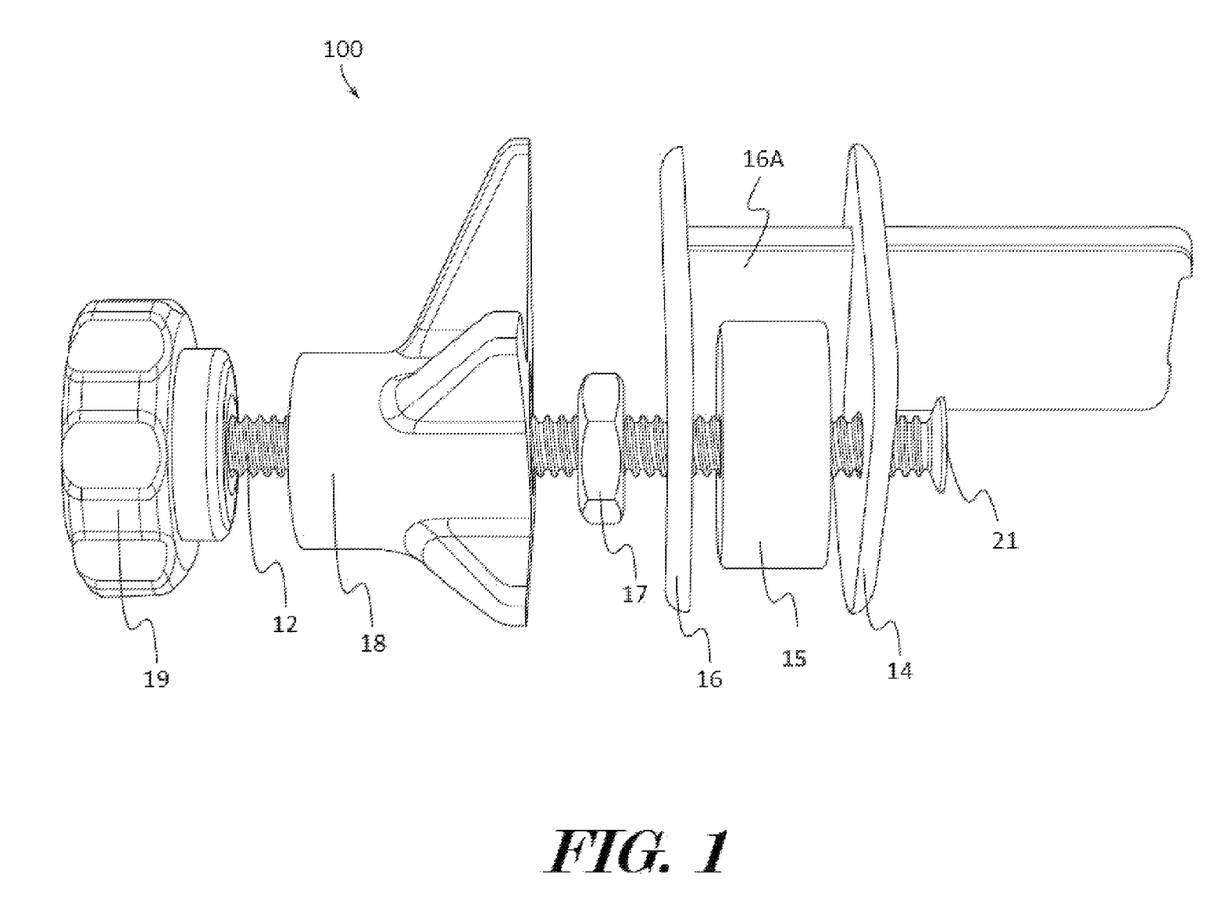
FIG. 1 depicts an elevation view of an example of an adhesive tape placement device according to various embodiments of the present invention.
Figure 2:
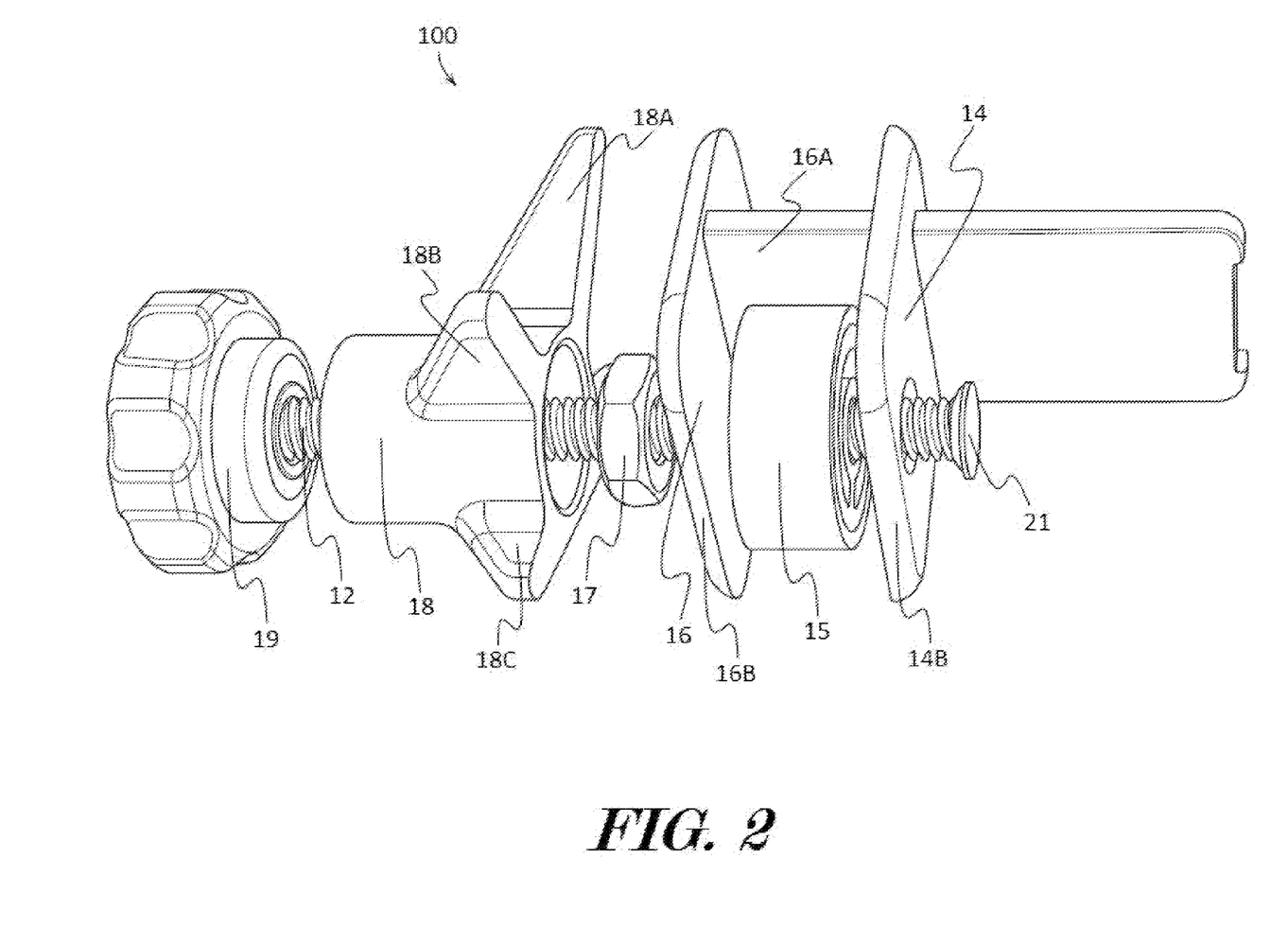
FIG. 2 illustrates a perspective view of an example of an adhesive tape placement device according to various embodiments of the present invention.

The present invention will now be described by referencing the appended figures representing preferred embodiments. FIG. 1 depicts an elevation view of an example of an adhesive tape placement device 100 (sometimes referred to as the "apparatus" or the "device"), while FIG. 2 illustrates a perspective view of an example of an adhesive tape placement device (the "device") 100 according to various embodiments of the present invention. In this and preferred embodiments, the device 100 comprises an elongated connection rod 12 having a first end 12A (FIGS. 3 and 4) and a second end 12B (FIGS. 3 and 4) with a connection rod cap 21 a second end 12B and an adjustable thumbscrew configured to couple with the elongated connection rod at the first end 12A. A spool 15 configured to receive and apply adhesive tape may comprise a connection rod receiving aperture 11 (FIGS. 4 and 5) and is secured to the elongated connection rod 12 by passing the elongated connection rod 12 through the connection rod receiving aperture 11 of the spool 15. Preferably, a connection rod cap 21 is coupled to, or integrally formed at one end of the elongated connection rod 12 and prevents the spool 15 and other elements from disengaging from one end of the elongated connection rod 12 and therefore the device 100. A first spool retainer 16 comprising a connection rod receiving aperture 11 (FIGS. 4 and 5) may also be secured to the elongated connection rod 12 at a position proximate to the spool 15 and preferably directly adjacent to the spool 15, by passing the elongated connection rod 12 through the connection rod receiving aperture 11 of the first spool retainer 16. An adjustable offset bumper 18 comprising a connection rod receiving aperture 11 (FIGS. 4 and 5) may also be secured to the elongated connection rod 12 at a position proximate to the first spool retainer 16 but preferably directly adjacent to the first spool retainer 16, by passing the elongated connection rod 12 through the connection rod receiving aperture 11 of the first spool retainer 16 and offset bumper 18. In preferred embodiments, a second spool retainer 14 preferably comprising a connection rod receiving aperture 11 (FIGS. 4 and 5) may be secured to the elongated connection rod 12 at a position proximate to the spool 15 and opposite the first spool retainer 16 whereby the spool 15 is located sandwiched between the first spool retainer 16 and second spool retainer 14 by passing the elongated connection rod 12 through the connection rod receiving aperture 11 of the second spool retainer 14. In this and preferred embodiments, a thumbscrew locknut 19 and an adjustable locking element 17 may be used to adjustably position and secure the adjustable offset bumper 18, first spool retainer 16, spool, 15, and second spool retainer 14 at various lateral positions along the elongated connection rod 12 so that in this embodiment the offset bumper 18 first spool retainer 16, spool, 15, and second spool retainer 14, are configured to be adjusted laterally (back and forth) along the elongated connection rod 12 thereby slidably engaging the elements at desired lateral positions.

The device 100 may be configured to apply an elongated adhesive material to an adherend. In preferred embodiments, the device 100 may comprise; an elongated connection rod 12; a spool 15 removably attached to the elongated connection rod 12 by placing the elongated connection rod 12 through an connection rod receiving aperture 11 on the spool 15; a first spool retainer 16 attached to the elongated connection rod 12 and configured to secure the spool 15 at a fixed lateral position about the elongated connection rod 12; and a connection rod cap 21 positioned at a second end 12B (FIG. 3) of the elongated connection rod 12 and configured to be larger than the connection rod receiving aperture 11 of the spool 15 thereby preventing the spool 15 from sliding off and disengaging with the device 100.

Figure 3:
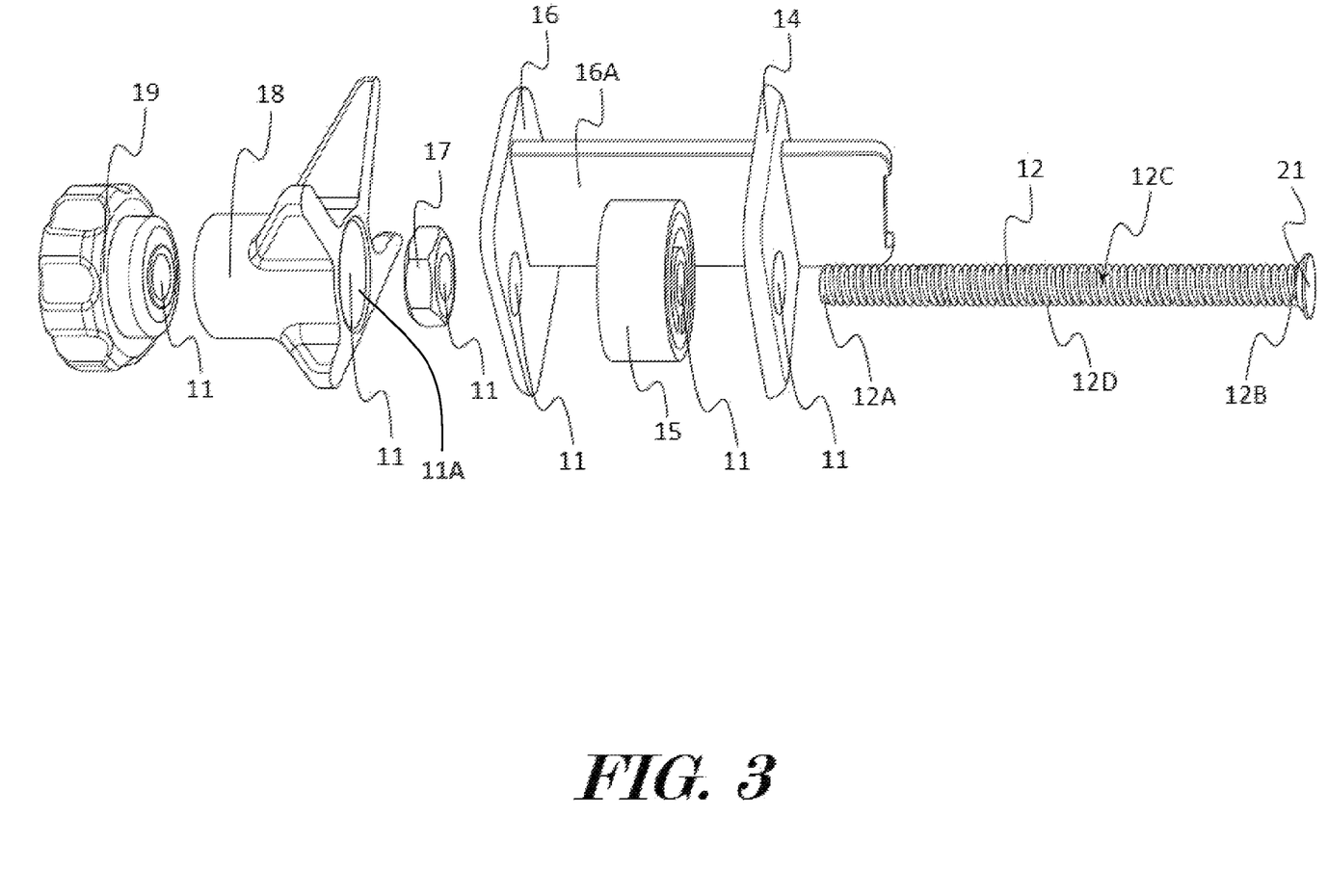
FIG. 3 shows an exploded perspective view of an example of an adhesive tape placement device according to various embodiments described herein.

In preferred embodiments, the elongated connection rod 12 may be made from metal or hard plastic and comprises threading 12D along its elongated surface 12C as shown in FIG. 3 and as is common with bolt type threaded fasteners. In other embodiments, the elongated connection rod may comprise a plurality of ridges, bumps, or other texturing. In alternative embodiments, the elongated connection rod 12 may not comprise threading or texturing. In further preferred embodiments, the elongated connection rod 12 may comprise a connection rod cap 21 on one end which may be configured with a larger diameter than the diameter of a connection rod receiving aperture 11 on an element of the device 100 thereby preventing elements such as the spool 15 and first spool retainer 16 from sliding off and disengaging with the connection rod 12 and the device 100.

FIG. 3 shows an exploded perspective view of an example of an adhesive tape placement device 100 according to various embodiments described herein. Preferably, the multiple components of the device shown here (sometimes referred to as the "elements") may each comprise a connection rod receiving aperture 11 which may optionally be threaded or textured, each of which may receive and be secured to a portion of the elongated connection rod 12. Elements comprising unthreaded or untextured connection rod receiving apertures 11 may rotate and slide freely along the length of the elongated connection rod 12. Elements comprising threaded connection rod receiving apertures 11 may be repositioned and rotated along the length of the elongated connection rod 12 by rotating the elements and/or the connection rod 12. Elements comprising textured connection rod receiving apertures 11 may be repositioned and rotated along the length of the elongated connection rod 12 by rotating or applying force to the elements and/or the connection rod 12. Therefore, each element comprising a connection rod receiving aperture 11 may be positioned along the length of the elongated connection rod 12, in addition to being able to rotate around the axis provided by the elongated connection rod 12.

In further embodiments, the device 100 may comprise an adjustable locking element 17 such as a threaded nut which may further comprise a connection rod receiving aperture 11. An adjustable locking element 17 comprising a connection rod receiving aperture 11 may also be secured to the elongated connection rod 12 at a position between the first spool retainer 16 and the adjustable offset bumper 18 by passing the elongated connection rod 12 through the connection rod receiving aperture 11 of the adjustable locking element 17. In preferred embodiments, the adjustable locking element may comprise a locknut which further comprises a connection rod receiving aperture 11 comprising threading that is complementary to threading 12C (FIG. 3) on the elongated connection rod 12 allowing the adjustable locking element 17 to be rotatably secured at various positions along the length of the elongated connection rod 12 by engaging with the threading 12C on the elongated connection rod 12. In some embodiments, an adjustable locking element 17 may be a metal or plastic nut type threaded fastener, a locknut, a thumb nut fastener, or the like. In other embodiments, the connection rod receiving aperture 11 of the adjustable locking element 17 may comprise texturing or a ball detent mechanism that is complementary a texturing on the elongated connection rod 12 allowing the adjustable locking element 17 to be rotatably or slidably secured at various positions along the length of the elongated connection rod 12. In yet further embodiments, adjustable offset bumper 18 may contain a recessed cavity 11A (FIG. 3 and FIG. 7A) around a threaded connection rod receiving aperture 11, said recessed cavity 11A configured to receive the adjustable locking element 17 while threadably engaged with the elongated connection rod 12 thereby allowing the adjustable offset bumper 18 to be placed (by turning it while threadably engaged with the connection rod 12) in direct contact or close proximity with the first spool retainer 16.

In further embodiments, the device 100 may comprise a thumbscrew locknut 19 which may further comprise a connection rod receiving aperture 11. A thumbscrew locknut 19 comprising a connection rod receiving aperture 11 may be secured to the elongated connection rod 12 at a position proximate to the adjustable offset bumper 18 but opposite to the adjustable locking element 17 by passing the elongated connection rod 12 through the connection rod receiving aperture 11 of the thumbscrew locknut 19. In preferred embodiments, the connection rod receiving aperture 11 of the thumbscrew locknut 19 may comprise threading that is complementary to threading on the elongated connection rod 12 allowing the thumbscrew locknut 19 to be rotatably secured at various positions along the length of the elongated connection rod 12. In some embodiments, a thumbscrew locknut 19 may comprise a thumb nut fastener, a nut type threaded fastener, a locknut, or the like. In other embodiments, the connection rod receiving aperture 11 of the thumbscrew locknut 19 may comprise texturing or a ball detent mechanism that is complementary a texturing on the elongated connection rod 12 allowing the thumbscrew locknut 19 to be rotatably or slidably secured at various positions along the length of the elongated connection rod 12.

The device 100 may comprise one or more spool retainers such as a first spool retainer 16 and/or a second spool retainer 14 each of which may be configured to be positioned on the elongated connection rod 12 proximate to and on opposite sides of the spool 15. The elongated connection rod 12 may pass through the connection rod receiving aperture 11 of a first spool retainer 16 thereby securing the first spool retainer 16 to the elongated connection rod 12 at a position proximate to the spool 15. Similarly, the elongated connection rod 12 may pass through the connection rod receiving aperture 11 of a second spool retainer 14 thereby securing the second spool retainer 14 to the elongated connection rod 12 at a position proximate to the spool 15 and on the side of the spool 15 opposite the first spool retainer 16.

In preferred embodiments, a first spool retainer 16 may comprise a tab 16A which may be configured to be slidably received or adapted to be engaged within a slot 14A on a second spool retainer 14. In preferred embodiments, a tab 16A may comprise a length that is generally greater than the width the spool 15 allowing portions of the tab 16A to occupy the slot 14A when relatively wider or narrower adhesive tapes are received on the spool 15. The tab 16A may be configured to slide a greater distance through a slot 14A when a smaller width adhesive tape is received on the spool 15 and to slide a lesser distance through a slot 14A when a larger width adhesive tape is received on the spool 15, thereby allowing the tab 16A to remain in the slot 14A when the device 100 is assembled as spools 15 and adhesive tapes with different widths are dispensed by the device 100. In some embodiments, by separating the non-adhesive backing material from the adhesive tape on a spool 15 and placing the tape and backing on opposite sides of a tab 16A, as the tape is applied and unwound from the spool 15, the tab 16A may facilitate the removal of the nonadhesive backing from the adhesive tape as the device 100 is moved over the adherend 200 (FIG. 8).

In some embodiments, a first spool retainer 16 and/or a second spool retainer 14 may be configured with a connection rod receiving aperture 11 which comprises threading that is complementary to threading on the elongated connection rod 12 allowing the first spool retainer 16 and/or a second spool retainer 14 to be rotatably secured at various positions along the length of the elongated connection rod 12. An adjustable locking element 17 and/or a thumbscrew locknut 19 also comprising threading may be positioned in contact with the first spool retainer 16 while a second spool retainer 14 may contact the connection rod cap 21 with the spool 15 positioned between the first spool retainer 16 and second spool retainer 14, thereby temporarily maintaining the position of the spool 15, first spool retainer 16, and second spool retainer 14 on the elongated connection rod 12.

In other embodiments, a first spool retainer 16 and/or a second spool retainer 14 may be configured with a connection rod receiving aperture 11 which comprises texturing or a ball detent mechanism that is complementary a texturing on the elongated connection rod 12 allowing the first spool retainer 16 and/or a second spool retainer 14 to be rotatably or slidably secured at various positions with the spool 15 positioned between, thereby temporarily maintaining the position of the spool 15, first spool retainer 16, and second spool retainer 14 on the elongated connection rod 12. Optionally, an adjustable locking element 17 and/or a thumbscrew locknut 19 also comprising texturing or a ball detent mechanism may be positioned in contact with the first spool retainer 16 while a second spool retainer 14 may contact the connection rod cap 21 with the spool 15 positioned between the first spool retainer 16 and second spool retainer 14, thereby temporarily maintaining the position of the spool 15, first spool retainer 16, and second spool retainer 14 on the elongated connection rod 12.

In further embodiments, a first spool retainer 16 and/or a second spool retainer 14 may be configured with a connection rod receiving aperture 11 which may not comprise threading or texturing allowing the first spool retainer 16 and/or a second spool retainer 14 to move freely along the length of the elongated connection rod 12. An adjustable locking element 17 comprising complementary threading or texturing to the elongated connection rod 12 may be positioned in on a side of the first spool retainer 16 opposite the spool 15, thereby temporarily maintaining the position of the adjustable offset bumper 18 on the elongated connection rod 12 the spool 15, first spool retainer 16, and second spool retainer 14 on the elongated connection rod 12.

In still further preferred embodiments, a first spool retainer 16 may comprise a first spool retainer distal edge 16B (FIG. 2). The first spool retainer distal edge 16B may be planar or curved and may preferably be configured so that portions of the first spool retainer distal edge 16B do not extend past the radius of the spool 15 as measured from the connection rod receiving aperture 11 of the spool 15 to the application surface 15A of the spool 15.

In still further preferred embodiments, a second spool retainer 14 may comprise a second spool retainer distal edge 14B (FIG. 2). The second spool retainer distal edge 14B may be planar or curved and may preferably be configured so that portions of the second spool retainer distal edge 14B do not extend past the radius of the spool 15 as measured from the connection rod receiving aperture 11 of the spool 15 to the application surface 15A of the spool 15.

Figure 4:
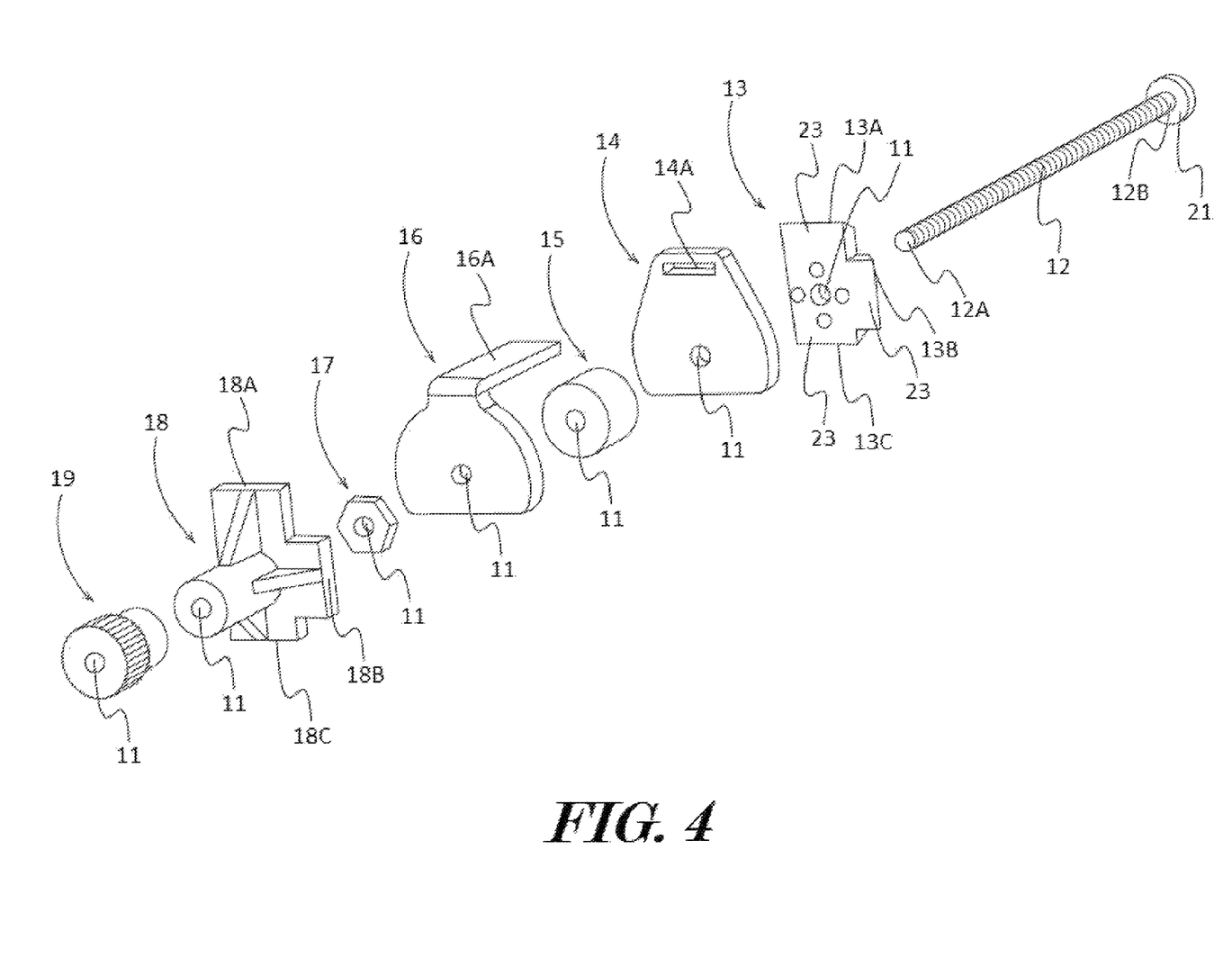
FIG. 4 depicts an exploded perspective view of an alternative example of an adhesive tape placement device according to various embodiments described herein.

FIG. 4 illustrates an exploded perspective view of an alternative example of an adhesive tape placement device 100 according to various embodiments described herein. In some alternative embodiments, the device 100 may comprise an optional indexing bumper 13 which may be configured with one or more indexing bumper guide arms. In preferred embodiments, an indexing bumper 13 may comprise a first indexing bumper guide arm 13A, a second indexing bumper guide arm 13B, and a third indexing bumper guide arm 13C which are capable of contacting, either alone or in a pair (e.g. two bumper guide arms) portions of a desired adherend. In some embodiments, the indexing bumper 13 may be configured with between one and eight offset bumper guide arms. The indexing bumper guide arms are preferably of assorted lengths thereby extending different distances from the connection rod receiving aperture 11 of the indexing bumper 13. In some embodiments, a first indexing bumper guide arm 13A may extend the shortest distance from the connection rod receiving aperture 11, while a third indexing bumper guide arm 13C may extend the greatest distance from the connection rod receiving aperture 11. In other embodiments, a first indexing bumper guide arm 13A may extend the greatest distance from the connection rod receiving aperture 11, while a third indexing bumper guide arm 13C may extend the shortest distance from the connection rod receiving aperture 11.

The indexing bumper guide arms are optionally configured to contact portions of an adherend as adhesive tape is applied and dispensed from the spool 15 onto the adherend. Optionally, one or more indexing bumper guide arms may be selected to contact the adherend and guide the motion of the device 100 in order to follow the contours of the adherend. By rotating the indexing bumper 13 around the elongated connection rod 12, one or more desired indexing bumper guide arms may be selected or orientated to contact a portion of the adherend, thereby guiding the movement of the device 100 as the adhesive tape is dispensed from the spool 15. Furthermore, by adjusting the distance between the indexing bumper 13 and the spool 15 by moving the indexing bumper 13 and/or the spool 15 relative to each other on the elongated connection rod 12, the adhesive tape may be applied to the adherend a distance proportional to the distance between the spool 15 and the point of contact between an indexing bumper guide arm and the adherend as the device 100 is moved along the adherend.

In some embodiments, the entire indexing bumper 13 or portions of an indexing bumper guide arm such as an optional indexing bumper guide surface 23 may comprise polytetrafluoroethylene (PTFE), polyethylene terephthalate (PET), high-density polyethylene (HDPE), polyvinyl chloride (PVC), polypropylene (PP), low density polyethylene (LDPE), Polyoxymethylene (POM), Ultra High Molecular Weight polyethylene, nylon, other substantially rigid plastics, hard rubbers, resins, ceramics, wood, carbon fiber, glass, metals and metal alloys, or any other suitable flexible natural or synthetic material including combinations of materials which may produce a suitable low friction surface for contacting and sliding over an adherend.

It should be understood to one of ordinary skill in the art that an indexing bumper 13 may comprise any number of indexing bumper guide arms each of which may extend in a plurality of different orientations from the indexing bumper 13. Additionally, the indexing bumper guide arms may be configured in a plurality of sizes and shapes including "T" shaped, "X" shaped, square shaped, rectangular shaped, cylinder shaped, cuboid shaped, hexagonal prism shaped, triangular prism shaped, or any other geometric or non-geometric shape, including combinations of shapes. In further embodiments, indexing bumper guide arms may be configured in complex curved or uncurved shapes such as a Saddle surface with normal planes in directions of principal curvatures, Gaussian curvature, hyperboloids, and the like. It is not intended herein to mention all the possible alternatives, equivalent forms or ramifications of the invention. It is understood that the terms and proposed shapes used herein are merely descriptive, rather than limiting, and that various changes may be made without departing from the spirit or scope of the invention.

Figure 5:
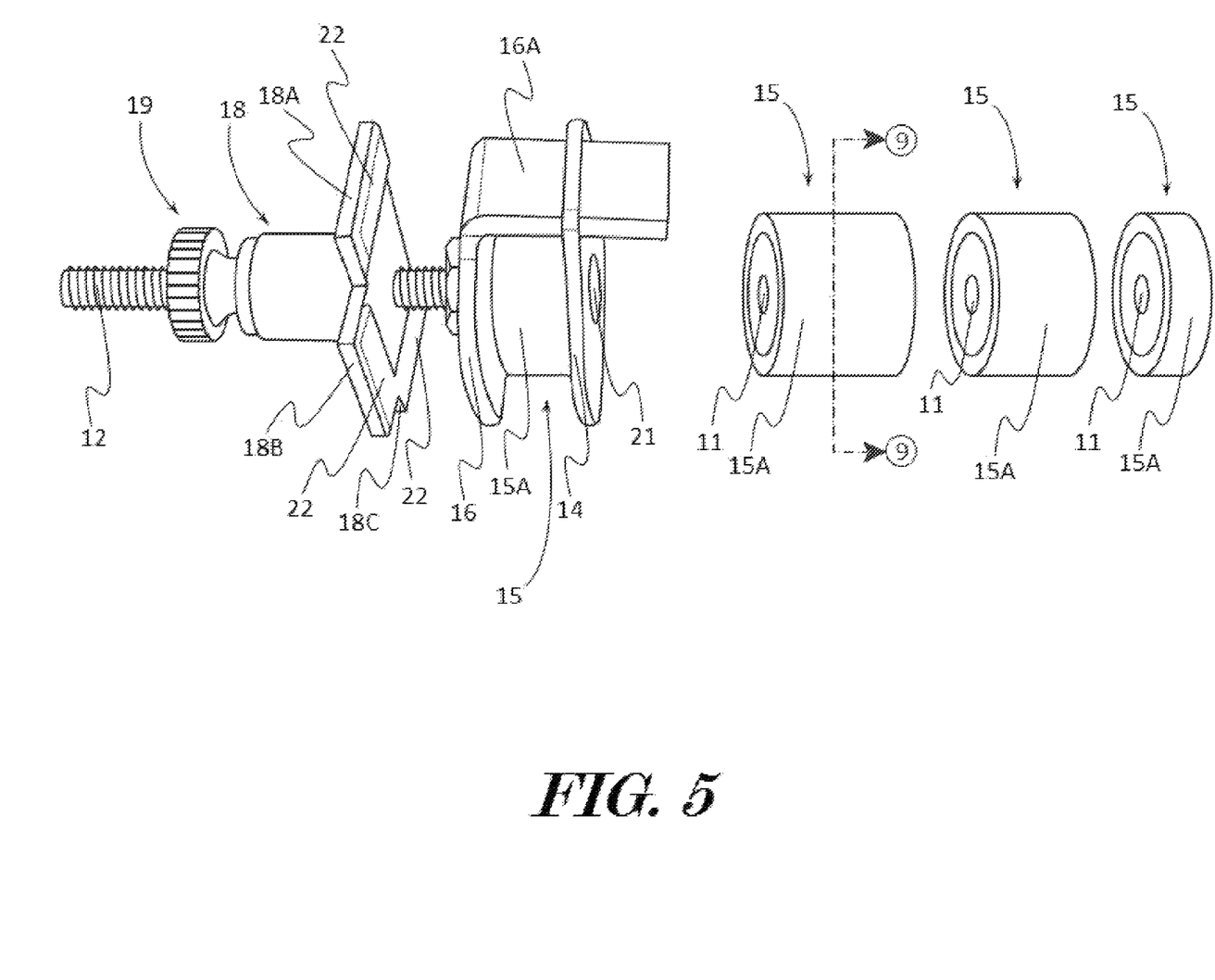
FIG. 5 illustrates a perspective view of an alternative example of an adhesive tape placement device with some examples of different sized spools according to various embodiments described herein.

FIG. 5 depicts a perspective view of an alternative example of an adhesive tape placement device with some examples of different sized spools according to various embodiments described herein. In this example, an indexing bumper 13 (FIG. 4) is not positioned on the elongated connection rod 12, so that only the adjustable offset bumper 18 is configured to guide the device 100. In other embodiments, the adjustable offset bumper 18 is not positioned on the elongated connection rod 12, while an indexing bumper 13 is positioned on the elongated connection rod 12 and acts as the guide for the device 100. In this embodiment, four interchangeable spools 15 are shown with one spool 15 positioned on the elongated connection rod 12. In preferred embodiments, the device may be reconfigured with one or more interchangeable spools 15 of assorted widths and diameters.

Figure 9:
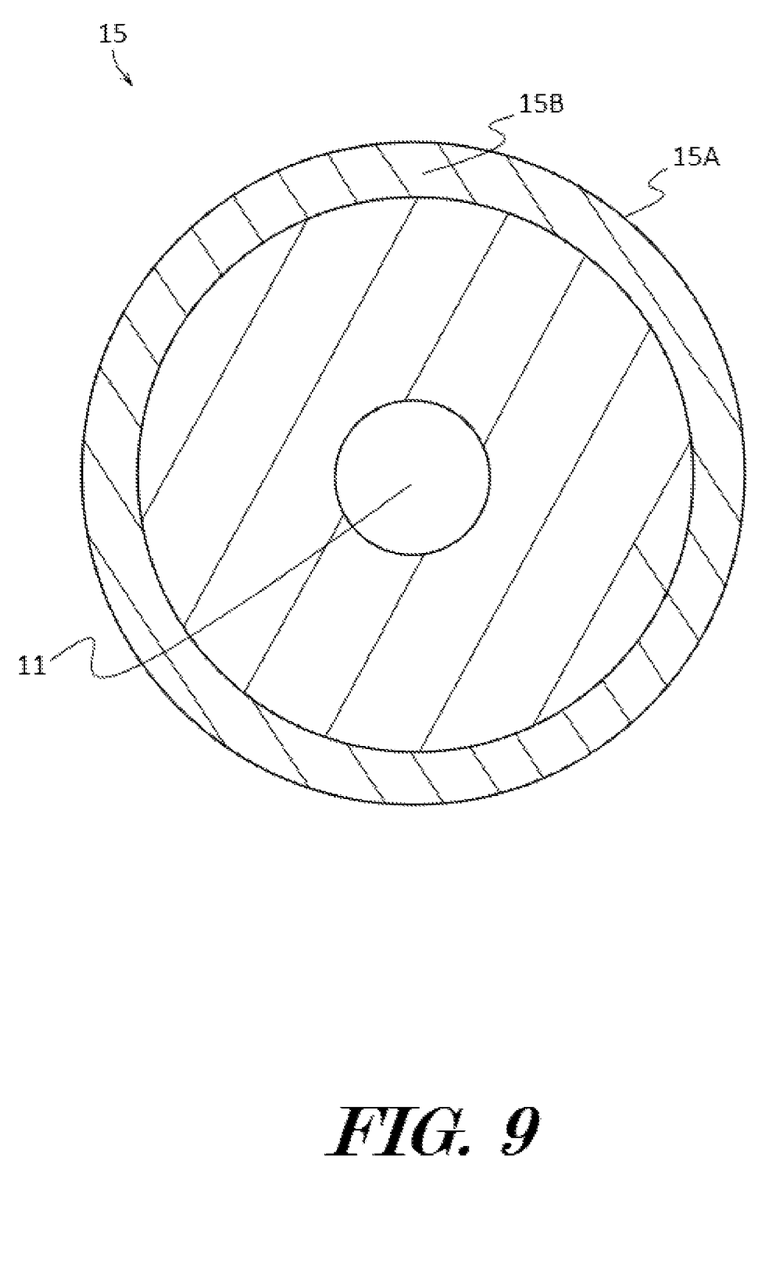
FIG. 9 shows a sectional, through line 9-9 shown in FIG. 5, elevation view of an example of a spool according to various embodiments described herein.

In preferred embodiments, the device 100 may temporarily and rotatably secure one or more interchangeable spools 15 on the elongated connection rod 12 by inserting the elongated connection rod 12 through the connection rod receiving aperture 11 of the spool 15. In preferred embodiments, the connection rod receiving aperture 11 of a spool 15 may be configured to rotate freely around the elongated connection rod 12. A spool 15 may be configured to receive a coiled length of tape around its outer circumference which forms an application surface 15A. The adhesive tape received on the spool 15 may be applied to an adherend by separating the adhesive tape from the backing material as the adhesive tape is guided and unwound 180 degrees from spool 15. In further preferred embodiments, the application surface 15A of the spools 15 may be made up of or comprise a soft compressionable or compressible material 15B (FIG. 9) such as felt, foam, soft plastics, silicone, soft rubber, cloth fabrics, Polytetrafluoroethylene (PTFE), Polyoxymethylene (POM), Ultra High Molecular Weight) polyethylene, or other similar or suitable materials which may produce a suitable low friction surface and/or resilient surface for receiving and dispensing adhesive tapes. In some embodiments, the spools 15 are interchangeable so that one or more spools 15 of various widths and diameters may be positioned on the elongated connection rod 12 allowing the device 100 to accommodate and apply adhesive tapes with different widths and lengths.

Figure 6A:
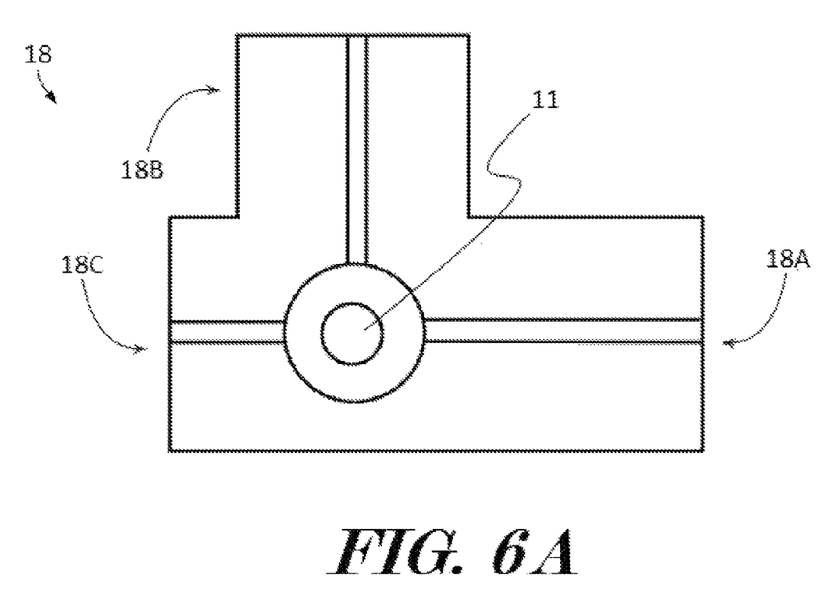
FIG. 6A shows a front elevation view of an alternative example of an offset bumper according to various embodiments described herein.
Figure 6B:
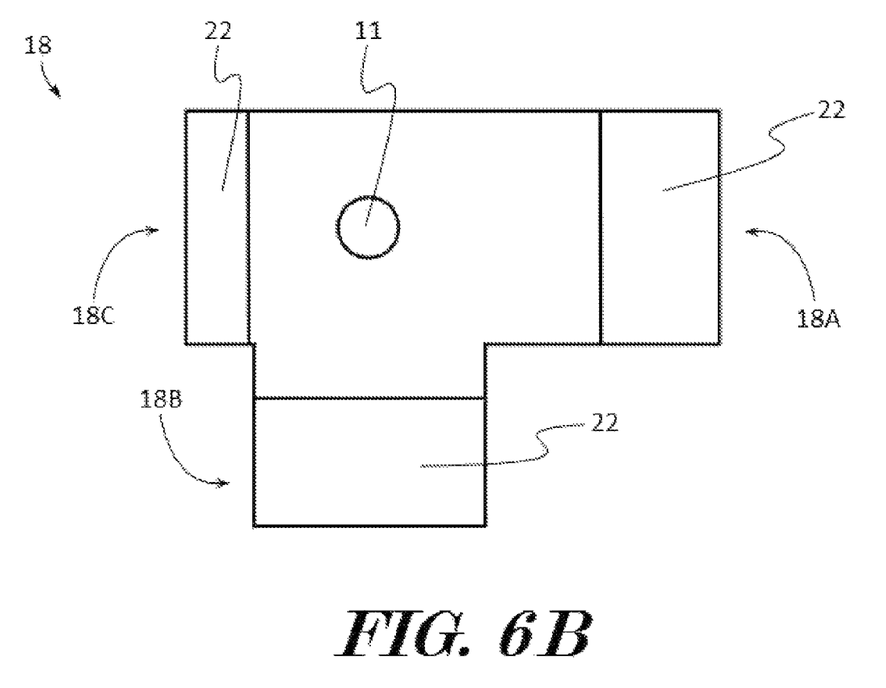
FIG. 6B depicts a back elevation view of an alternative example of an offset bumper according to various embodiments described herein.

Turning now to the front and back elevation views of an alternative example of an offset bumper in FIG. 6 and to the front and back elevation views of a preferred example of an offset bumper in FIG. 7, the adjustable offset bumper 18 is configured with a connection rod receiving aperture 11 which preferably comprises threading that is complementary to threading on the elongated connection rod 12 allowing the adjustable offset bumper 18 to be rotatably secured at various positions along the length of the elongated connection rod 12. In further preferred embodiments, the adjustable offset bumper 18 may be slidably engaged about the elongated connection rod 12 by inserting the elongated connection rod 12 through the connection rod receiving aperture 11 of the adjustable offset bumper 18 and moving the adjustable offset bumper 18 by rotating or sliding the adjustable offset bumper 18 relative to the elongated connection rod 12.

A connection rod receiving aperture 11 of an adjustable locking element 17 and/or a thumbscrew locknut 19 also comprising threading may be positioned in contact with the adjustable offset bumper 18, thereby temporarily maintaining the position of the adjustable offset bumper 18 on the elongated connection rod 12. In the embodiment shown in FIG. 6, the adjustable offset bumper 18 comprises a first offset bumper guide arm 18A, a second offset bumper guide arm 18B, and a third offset bumper guide arm 18C, all of which comprise a generally rectangular shape. In the embodiment shown in FIG. 7, the adjustable offset bumper 18 comprises a first offset bumper guide arm 18A, a second offset bumper guide arm 18B, a third offset bumper guide arm 18C, and a fourth offset bumper guide arm 18D all of which comprise a generally triangular or rounded shape.

Figure 7A:
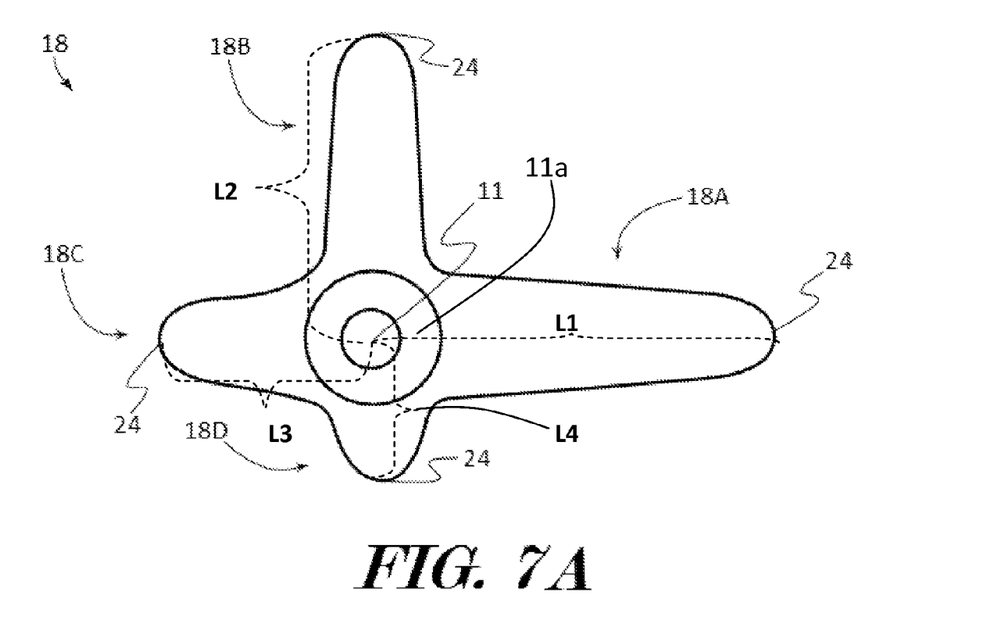
FIG. 7A shows a front elevation view of a preferred example of an offset bumper according to various embodiments described herein.
Figure 7B:
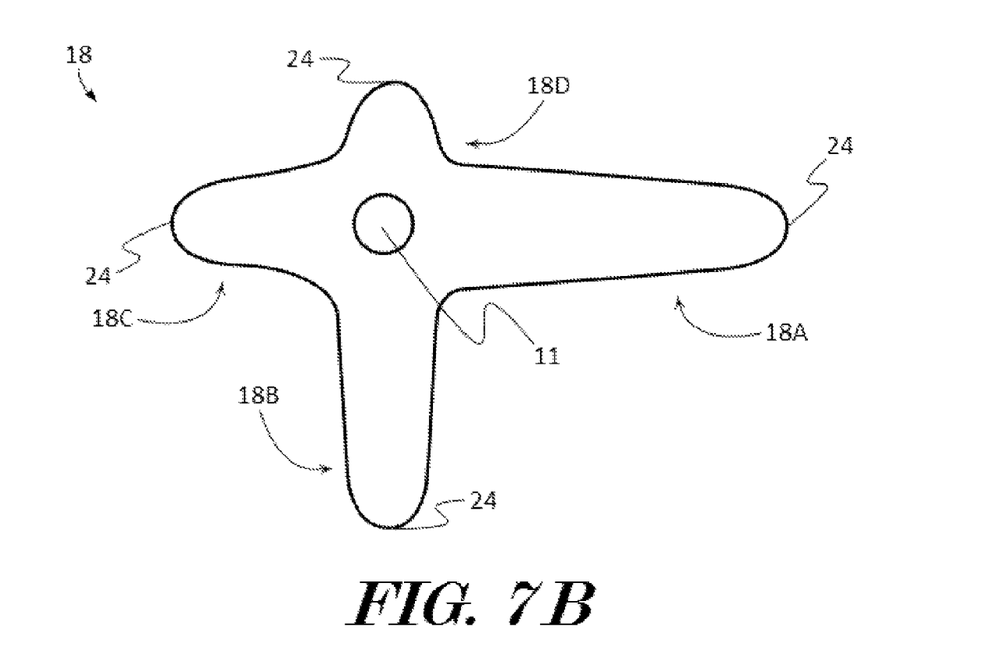
FIG. 7B depicts a back elevation view of a preferred example of an offset bumper according to various embodiments described herein.

As shown in FIGS. 7A and 7B, each offset bumper guide arm may comprise a distal tip 24 which may form the portion of each offset bumper guide arm that is the farthest distance from the connection rod receiving aperture 11 of the adjustable offset bumper 18. In preferred embodiments and as shown by example in FIG. 7A, the length between the distal tip 24 of the first offset bumper guide arm 18A and the center of the connection rod receiving aperture 11 of the adjustable offset bumper is a first length (L1); the length between the distal tip 24 of the second offset bumper guide arm 18B and the center of the connection rod receiving aperture 11 of the adjustable offset bumper 18 is of a second length (L2); the length between the distal tip 24 of the third offset bumper guide arm 18C and the center of the connection rod receiving aperture 11 of the adjustable offset bumper 18 is of a third length (L3); and the length between the distal tip 24 of the fourth offset bumper guide arm 18D and the center of the connection rod receiving aperture 11 of the adjustable offset bumper 18 is of a fourth length (L4). In further preferred embodiments, L1 is greater than L2, L2 is greater than L3, and L3 is greater than L4. In other embodiments, L1 may be greater than, equal to, or less than L2, L3, and/or L4. In further embodiments, L2 may be greater than, equal to, or less than L1, L3, and/or L4. In further embodiments, L3 may be greater than, equal to, or less than L1, L2, and/or L4. In still further embodiments, L4 may be greater than, equal to, or less than L1, L2, and/or L3. In still further embodiments, L1 may be about 0.92 inches and L2 may be about 0.78 inches, while L3 may be about 0.77 inches.

It should be understood to one of ordinary skill in the art that an adjustable offset bumper 18 may comprise any number of offset bumper guide arms each of which may extend in a plurality of different orientations from the adjustable offset bumper 18. Additionally, the offset bumper guide arms may be configured in a plurality of sizes and shapes including "T" shaped, "X" shaped, square shaped, rectangular shaped, cylinder shaped, cuboid shaped, hexagonal prism shaped, triangular prism shaped, or any other geometric or non-geometric shape, including combinations of shapes. In further embodiments, offset bumper guide arms may be configured in complex curved or uncurved shapes such as a Saddle surface with normal planes in directions of principal curvatures, Gaussian curvature, hyperboloids, and the like. It is not intended herein to mention all the possible alternatives, equivalent forms or ramifications of the invention. It is understood that the terms and proposed shapes used herein are merely descriptive, rather than limiting, and that various changes may be made without departing from the spirit or scope of the invention.

In further embodiments, the connection rod receiving aperture 11 of the adjustable offset bumper 18 may comprise texturing or a ball detent mechanism that is complementary a texturing on the elongated connection rod 12 allowing the adjustable offset bumper 18 to be rotatably or slidably secured at various positions along the length of the elongated connection rod 12. A connection rod receiving aperture 11 of an adjustable locking element 17 and/or a thumbscrew locknut 19 also comprising texturing or a ball detent mechanism may be positioned in contact with the adjustable offset bumper 18, thereby temporarily maintaining the position of the adjustable offset bumper 18 on the elongated connection rod 12.

In further alternative embodiments, the adjustable offset bumper 18 is configured with a connection rod receiving aperture 11 and recessed cavity 11A (FIG. 3 and FIG. 7A) which may not comprise threading or texturing allowing the adjustable offset bumper 18 to move freely along the length of the elongated connection rod 12. An adjustable locking element 17 and a thumbscrew locknut 19 each comprising a connection rod receiving aperture 11 configured with threading, texturing, or a ball detent mechanism which is complementary to a threading or texturing on the elongated connection rod 12, may be positioned on opposite sides of the adjustable offset bumper 18 and in contact with the adjustable offset bumper 18, thereby temporarily maintaining the position of the adjustable offset bumper 18 on the elongated connection rod 12.

An adjustable offset bumper 18 may be configured with one or more offset bumper guide arms. In preferred embodiments, an adjustable offset bumper 18 may comprise a first offset bumper guide arm 18A, a second offset bumper guide arm 18B, and a third offset bumper guide arm 18C, and/or a fourth offset bumper guide arm 18D which are capable of contacting portions of a desired adherend. In some embodiments, the adjustable offset bumper 18 may be configured with between one and eight offset bumper guide arms. The offset bumper guide arms are preferably of assorted lengths thereby extending different distances from the connection rod receiving aperture 11 of the adjustable offset bumper 18. For example, in some embodiments, a first offset bumper guide arm 18A may extend the shortest distance from the connection rod receiving aperture 11, while a third offset bumper guide arm 18C may extend the greatest distance from the connection rod receiving aperture 11. In another example and in other embodiments, a first offset bumper guide arm 18A may extend the greatest distance from the connection rod receiving aperture 11, while a fourth offset bumper guide arm 18D may extend the shortest distance from the connection rod receiving aperture 11.

The offset bumper guide arms are optionally configured to contact portions of an adherend as adhesive tape is applied and dispensed from the spool 15 onto the adherend. Optionally, one or more offset bumper guide arms may be selected to contact the adherend and guide the motion of the device 100 in order to follow the contours of the adherend. By rotating the adjustable offset bumper 18 around the elongated connection rod 12, one or more desired offset bumper guide arms may be selected or orientated to contact a portion of the adherend, thereby guiding the movement of the device 100 as the adhesive tape is dispensed from the spool 15. Furthermore, by adjusting the distance between the adjustable offset bumper 18 and the spool 15 by moving the adjustable offset bumper 18 and/or the spool 15 relative to each other on the elongated connection rod 12, the adhesive tape may be applied to the adherend a distance proportional to the distance between the spool 15 and the point of contact between an offset bumper guide arm and the adherend as the device 100 is moved along the adherend.

In some embodiments, the entire adjustable offset bumper 18 or portions of an offset bumper guide arm such as an optional offset bumper guide surface 22 may comprise polytetrafluoroethylene (PTFE), polyethylene terephthalate (PET), high-density polyethylene (HDPE), polyvinyl chloride (PVC), polypropylene (PP), low density polyethylene (LDPE), Polyoxymethylene (POM), Ultra High Molecular Weight polyethylene, nylon, other substantially rigid plastics, hard rubbers, resins, ceramics, wood, carbon fiber, glass, metals and metal alloys, or any other suitable flexible natural or synthetic material including combinations of materials which may produce a suitable low friction surface for contacting and sliding over an adherend.

Figure 8A:
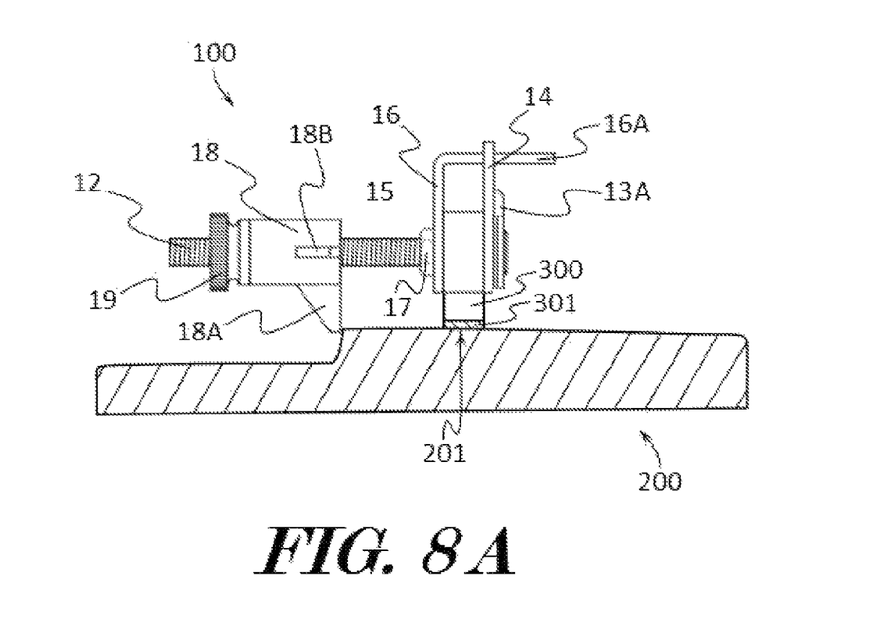
FIG. 8A illustrates an elevation view of an example of an adhesive tape placement device positioned directly above an adherend according to various embodiments described herein.
Figure 8B:
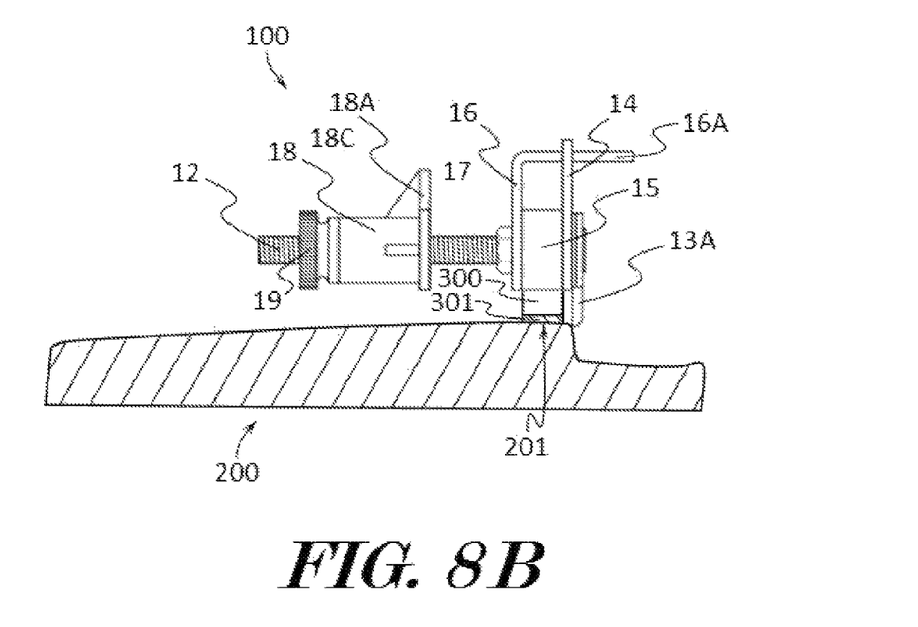
FIG. 8B shows an elevation view of an alternative example of an adhesive tape placement device positioned directly above an adherend according to various embodiments described herein.

As perhaps best shown in FIG. 8, the elements of the device 100 are configured to be positioned along the elongated connection rod 12 at distances from each other that allow the optional indexing bumper 13 or the adjustable offset bumper 18 to contact the desired portion of an object with a surface comprising an adherend 200 such as a wheel rim, a tire, a helmet, a fender, or any other object to which an adhesive tape 300 is to be applied to. By rotating an adjustable offset bumper 18 around an elongated connection rod 12, one or more, and optionally none, of the offset bumper guide arms may be orientated to contact a portion of an object with a surface comprising an adherend 200 (FIG. 8A). The adjustable offset bumper 18 is configured to rotate about the elongated connection rod 12 so that the first offset bumper guide arm 18A and therefore the other offset bumper guide arms, may be positioned in a first orientation and rotated by turning the adjustable offset bumper 18 resulting in the first offset bumper guide arm 18A being positioned in a second orientation. A first orientation can vary from a second orientation between 0 degrees and 360 degrees of rotation about the rotational axis provided by the elongated connection rod 12. Likewise, by rotating an optional indexing bumper 13 around an elongated connection rod 12, one or more, and optionally none, of the indexing bumper guide arms may be orientated to contact a portion of an object with a surface comprising an adherend 200 (FIG. 8B). The indexing bumper 13 is configured to rotate about the elongated connection rod 12 so that the first indexing bumper guide arm 13A and therefore the other indexing bumper guide arms, may be positioned in a first orientation and rotated by turning the indexing bumper 13 resulting in the first indexing bumper guide arm 13A being positioned in a second orientation. A first orientation can vary from a second orientation between 0 degrees and 360 degrees of rotation about the rotational axis provided by the elongated connection rod 12. The user can then guide the device 100 while using the interface of the object with a surface comprising an adherend 200, the indexing bumper 13, and/or an adjustable offset bumper 18 to conform the movement of the device 100 to the contours of the adherend 201 while the adhesive tape 300 is being applied. At the same time, the adhesive tape is being applied and pressed onto the adherend 201 by the interchangeable spool 15 resulting in uniform positioning of the adhesive tape applied to the adherend 301 relative to the contours of the adherend 201.

As shown in FIG. 8A which illustrates an elevation view of an example of an adhesive tape placement device 100 and FIG. 8B which shows an elevation view of an alternative example of an adhesive tape placement device 100, both of which are positioned directly above an object with a surface comprising an adherend 200, by rotating an optional indexing bumper 13 and/or the adjustable offset bumper 18 the device 100 may be capable of applying adhesive tape 300 by both right handed and left handed individuals and in both a forwards and backwards motion relative to the object with a surface comprising an adherend 200. In both FIG. 8A and FIG. 8B, the device 100 is shown in profile and positioned above an object with a surface comprising an adherend 200 which may be a vehicle wheel, fender, body panel, helmet or other surface to which adhesive tape 300 is desired to be applied to. FIG. 8A depicts an example of an embodiment of an adhesive tape positioning device 100 in which one of the offset bumper guide arms 18A is configured to contact a portion of an object with a surface comprising an adherend 200. In this example, the optional indexing bumper 13 is rotated so that it does not come in contact with the adherend 200. Turning now to FIG. 8B, by rotating the adjustable offset bumper 18 and the indexing bumper 13 (FIG. 3B), indexing bumper guide arms 13A can be used as a guide by contacting the adherend 200 while the adhesive tape 300 is pressed onto the adherend 201 by the spool 15 resulting in adhesive tape applied to adherend 301.

In preferred embodiments, the elongated connection rod 12 may comprise threading and the connection rod receiving apertures 11 of a thumbscrew locknut 19, adjustable offset bumper 18, and an adjustable locking element 17 comprise threading that is complementary to the threading on the elongated connection rod 12, thereby allowing the thumbscrew locknut 19, adjustable offset bumper 18, and adjustable locking element 17 to be rotatably positioned at a plurality of fixed positions on the elongated connection rod 12. Furthermore, the spool 15, first spool retainer 16, second spool retainer 14, and an optional indexing bumper 13 may be configured with connection rod receiving apertures 11 that do not comprise threading and are larger in diameter than the diameter of the threaded elongated connection rod 12, thereby allowing the spool 15, first spool retainer 16, second spool retainer 14, and optional indexing bumper 13 to slide and rotate freely along the length of the elongated connection rod 12 so that their positions may not be fixed relative to the thumbscrew locknut 19, adjustable offset bumper 18, and/or adjustable locking element 17.

In further preferred embodiments, the device 100 may comprise a starter stick which may be configured to be positioned between an adhesive tape and its removable non-adhesive backing to facilitate starting the process of applying the adhesive tape to an adherend. A starter stick may comprise a stick, rod, disk, or other suitable object which preferably comprises a dimension such as a length or a width that is the same or greater than the width of the adhesive tape to be applied. By peeling a portion of the backing from the adhesive tape and inserting the starter stick between the two, the backing may be prevented from re-adhering to the adhesive tape allowing the backing to be quickly removed once application of the adhesive tape commences.

While some preferred materials for elements have been described, the device is not limited by these materials. The elements that comprise the device may be made from durable materials such as hard plastics, metal alloys, wood, hard rubbers, carbon fiber, fiber glass, resins, polymers or any other suitable materials including combinations of materials. Additionally, one or more elements may be made from or comprise durable and slightly flexible materials such as soft plastics, silicone, soft rubbers, or any other suitable materials including combinations of materials.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

What is claimed is:

1. A handheld adhesive tape placement device for applying adhesive tape to an adherend, the device comprising:
   a. an elongated connection rod having a first end and a second end;
   b. a spool adapted to contact the adhesive tape, said spool having a connection rod receiving aperture wherein the elongated connection rod passes through the connection rod receiving aperture thereby securing the spool to the elongated connection rod;
   c. a first spool retainer having a connection rod receiving aperture wherein the elongated connection rod passes through the connection rod receiving aperture thereby securing the first spool retainer to the elongated connection rod at a position proximate to the spool; and
   d. an adjustable offset bumper having a connection rod receiving aperture wherein the elongated connection rod passes completely through the connection rod receiving aperture so that the adjustable offset bumper is positioned between the elongated connection rod first end and the spool thereby securing the adjustable offset bumper to the elongated connection rod at a position proximate to the first spool retainer;
   e. a first offset bumper guide arm extending radially out from the offset bumper connection rod aperture of the adjustable offset bumper;
   f. a second offset bumper guide arm positioned adjacent to the first offset bumper guide arm, said second offset bumper guide arm extending radially out from the offset bumper connection rod aperture of the adjustable offset bumper; and
   wherein said first offset bumper guide arm and said second offset bumper guide arm have different lengths with each of said first offset bumper guide arm and said second offset bumper guide configured to contact the adherend as the tape is being applied by the adhesive tape placement device.

2. The device of claim 1, wherein the adjustable offset bumper is positioned between an adjustable thumbscrew at said first end of the elongated connection rod and the spool.

3. The device of claim 2, wherein the adjustable offset bumper is configured to be secured to the elongated connection rod at a plurality of fixed positions whereby a distance between the adjustable offset bumper and the spool is not fixed.

4. The device of claim 1, wherein each of the first and second offset bumper guide arms comprise a distal tip, and wherein:
   a. the length between the distal tip of the first offset bumper guide arm and the connection rod receiving aperture of the adjustable offset bumper is a first length (L1); and
   b. the length between the distal tip of the second offset bumper guide arm and the connection rod receiving aperture of the adjustable offset bumper is of a second length (L2).

5. The device of claim 4 wherein L1 is greater than L2.

6. The device of claim 1, wherein the adjustable offset bumper further comprises a third offset bumper guide arm.

7. The device of claim 6, wherein each offset bumper guide arm comprises a distal tip, and wherein:
   a. the length between the distal tip of the first offset bumper guide arm and the connection rod receiving aperture of the adjustable offset bumper is a first length (L1);
   b. the length between the distal tip of the second offset bumper guide arm and the connection rod receiving aperture of the adjustable offset bumper is of a second length (L2); and
   c. the length between the distal tip of the third offset bumper guide arm and the connection rod receiving aperture of the adjustable offset bumper is of a third length (L3).

8. The device of claim 7, wherein L1 is greater than L2 and L3.

9. The device of claim 6, wherein the adjustable offset bumper is configured to rotate about the elongated connection rod whereby the first offset bumper guide arm may be positioned in a first orientation and rotated by turning the adjustable offset bumper so that the first offset bumper guide arm may be positioned in a second orientation.

10. The device of claim 1, wherein the device further comprises a second spool retainer having a connection rod receiving aperture wherein the elongated connection rod passes through the connection rod receiving aperture thereby securing the second spool retainer to the elongated connection rod at a position proximate to the spool.

11. The device of claim 10, wherein the spool is positioned between the first spool retainer and the second spool retainer.

12. The device of claim 11, wherein the first spool retainer comprises a tab adapted to engage within a slot located within the second spool retainer.

13. The device of claim 1, wherein the elongated connection rod is a threaded elongated connection rod with threading.

14. The device of claim 13, further comprising an adjustable locking element having a connection rod receiving aperture wherein the elongated connection rod passes through the connection rod receiving aperture of the adjustable locking element thereby securing the adjustable locking element to the elongated connection rod at a position between the first spool retainer and the adjustable offset bumper.

15. The device of claim 14, wherein the adjustable locking element is a locknut with threading configured to engage with the threaded elongated connection rod.

16. The device of claim 1, wherein the device further comprises a connection rod cap located at the second end of the elongated connection rod.

17. The device of claim 1, wherein the spool contains an application surface made up of a compressible material.

18. The device of claim 17, wherein the application surface contains felt.

19. A device for applying an elongated adhesive material to an adherend, the device comprising;
   a. an elongated connection rod having a first end and a second end;
   b. a spool removably attached to the elongated connection rod by placing the elongated connection rod through a connection rod receiving aperture on the spool;
   c. a first spool retainer attached to the elongated connection rod by placing the elongated connection rod through a connection rod receiving aperture on the first spool retainer, wherein the first spool retainer is configured to secure the spool at a fixed lateral position about the elongated connection rod; and
   d. a connection rod cap positioned at a distal end of the elongated connection rod and configured to be larger than the connection rod receiving aperture of the spool thereby preventing the spool from sliding off the elongated connection rod and disengaging from the device;
   e. an adjustable offset bumper having a connection rod receiving aperture wherein the elongated connection rod passes completely through the connection rod receiving aperture thereby securing the adjustable offset bumper to the elongated connection rod at a position proximate to the first spool retainer and between the elongated connection rod first end and the spool;
   f. a first offset bumper guide arm extending radially out from the offset bumper connection rod aperture of the adjustable offset bumper;
   g. a second offset bumper guide arm positioned adjacent to the first offset bumper guide arm, said second offset bumper guide arm extending radially out from the offset bumper connection rod aperture of the adjustable offset bumper; and
   wherein said first offset bumper guide arm and said second offset bumper guide arm have different lengths with each of said first offset bumper guide arm and said second offset bumper guide configured to contact the adherend as the adhesive material is being applied by the device.

\* \* \* \* \*